(12) United States Patent
Montenieri et al.

(10) Patent No.: US 6,506,464 B1
(45) Date of Patent: Jan. 14, 2003

(54) SQUEEZABLE MULTILAYERED CONTAINER

(75) Inventors: Robert E. Montenieri, Southington, CT (US); Gary Tremley, Plainville, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/379,921

(22) Filed: Aug. 24, 1999

(51) Int. Cl.$^7$ .......................... B32B 27/32; B32B 27/34
(52) U.S. Cl. ...................... 428/36.7; 428/515; 428/516; 428/518
(58) Field of Search ................................ 428/36.7, 515, 428/516, 518

(56) References Cited

U.S. PATENT DOCUMENTS

| | | | |
|---|---|---|---|
| 4,188,441 A | 2/1980 | Cook | 428/216 |
| 4,261,482 A * | 4/1981 | Yamada et al. | 222/215 |
| 4,364,989 A | 12/1982 | Moyle | 428/216 |
| 4,407,874 A | 10/1983 | Gehrke | 428/35 |
| 4,608,286 A | 8/1986 | Motoishi et al. | 428/35 |
| 4,615,926 A | 10/1986 | Hsu et al. | 428/35 |
| 4,704,314 A | 11/1987 | Hsu et al. | 428/35 |
| 4,816,304 A * | 3/1989 | Nohara et al. | 428/36.7 |
| 4,939,009 A | 7/1990 | Beavers et al. | 428/35.2 |
| 5,849,376 A * | 12/1998 | Oishi et al. | 428/34.9 |

FOREIGN PATENT DOCUMENTS

GB     2337470 A  *  11/1999  ........... B65D/65/42

* cited by examiner

Primary Examiner—Sandra M. Nolan
(74) Attorney, Agent, or Firm—Hoffmann & Baron, LLP

(57) ABSTRACT

A squeezable, multi-layer, structurally self-supporting container capable of dispensing a controlled amount of a liquid product. The container comprises an external layer of a polyolefin material, an internal layer formed of a polyolefin material, and an intermediate layer positioned between the external layer and the internal layer. The intermediate layer is formed of a barrier material blended with an adhesive resin and a carrier.

19 Claims, 1 Drawing Sheet

SQUEEZABLE MULTILAYERED CONTAINER

FIELD OF THE INVENTION

The present invention relates generally to squeezable containers which are formed of two or more layers of different materials. More particularly, the present invention is directed to a multilayered, squeezable, structurally self-supporting container which is capable of dispensing a controlled amount of product.

BRIEF DESCRIPTION OF RELATED TECHNOLOGY

Certain adhesives, such as those which contain a volatile component, must be housed in a container which prevents moisture and oxygen ingress into the container, and egress of the volatile component of the adhesive out of the container. It is important to provide a container which can control both ingress and egress, because either one will typically be detrimental to the adhesive housed within the container, or the container itself.

For example, cyanoacrylate adhesives are adversely affected by moisture, and exposure to such will cause the adhesive to begin to "set." If exposure occurs within the container, the relatively fast reactive nature of the adhesive will cause the adhesive solidify within the container, thus making the adhesive unusable.

Also, if the container does not prevent the release of the volatile component of the adhesive through the container wall, then "blooming" may be seen on the outside of the container. "Blooming" is the formation of unsightly deposits on the exterior surface of the container.

In order to provide an effective barrier, containers for housing cyanoacrylate adhesives have been formed from a multi-layer composite structure. A traditional multi-layer material used for cyanoacrylate adhesive containers is a five layer structure comprising a layer of low-density polyethylene, a tie layer of an adhesive, a layer of EVOH, a tie layer of an adhesive, and a final layer of low to moderate-density polyethylene. Each the separate layers serves a particular purpose. First, the innermost layer of HDPE provides a moisture barrier to protect the adhesive and the moisture sensitive EVOH layer, and the tie layers provide a means of adhering the EVOH layer to the polyethylene layers. Without the tie layers to bond the other layers together, the container would easily delaminate and become susceptible to mechanical failure. This traditional structure also requires five separate extruders in order to form the multi-layer material for the container.

It is also desirable to have a container for cyanoacrylate adhesives which, while providing a sufficient barrier, is also readily squeezable by the human hand. The problem arises, however, when softer, more deformable materials are used for the container walls. These softer materials typically have an adverse reaction to the volatile component of the adhesive, which results in "ballooning" of the container walls. Also, the more readily deformable material typically has a higher transmission rate of vapor, moisture, and oxygen, which, as stated above, can adversely effect the adhesive and the container.

Therefore, there still remains the need for a container for housing cyanoacrylate adhesives which will provide a vapor barrier, and a moisture barrier, and yet may be easily deformed by the human hand to enable accurate dispensing of a small quantity of adhesive.

SUMMARY OF THE INVENTION

The present invention provides a squeezable, multi-layer, structurally self-supporting container capable of dispensing a controlled amount of a liquid product. The container comprises an external layer of a polyolefin material, an internal layer formed of a polyolefin material, and an intermediate positioned between the external layer and the internal layer. The intermediate layer is formed of a barrier material blended with an adhesive resin.

The external layer and the internal layer are preferably polyethylene, polypropylene, or blends of polyethylene and polypropylene. Most preferably, the internal layer should be HDPE and the external layer are low-density polyethylene.

The barrier material making up a portion of the intermediate layer is preferably ethylene vinyl alcohol. The adhesive resin making up a portion of the intermediate layer is preferably an anhydride-modified polyolefin. Most preferably, the adhesive resin is an anhydride-modified polyethylene, an anhydride-modified high-density polyethylene, an anhydride-modified linear low-density polyethylene, an anhydride-modified low-density polyethylene, or an anhydride-modified polypropylene.

The advantages of the present invention are numerous. First, the reduction of the number of layers comprising the wall of the container decreases the number of steps required to manufacture the container itself. Also, the reduction of the number of layers allows the fabrication of a container which is structurally self-supporting under its own weight, while simultaneously being easily deformed by pressure applied by the human hand, thus enabling an accurate dispensing of a small amount of product. Additionally, the novel structure of the container provides an effective vapor and moisture barrier. With these and other advantages and features of the invention that may become apparent, the nature of the invention may be more clearly understood by reference to the following detailed description of the invention, the appended claims, and to the several drawings attached herein.

BRIEF DESCRIPTION OF THE DRAWINGS

Further objects and features of the present invention will better be understood in light of the embodiment examples which are discussed below with the aid of a drawing wherein.

DETAILED DESCRIPTION OF THE INVENTION

The following description of the invention details the use of the present invention in conjunction with a container for cyanoacrylate adhesives. This example, however, is merely illustrative, and is in no way intended to limit the use of the present invention to a container for cyanoacrylate adhesives.

Figure 1:
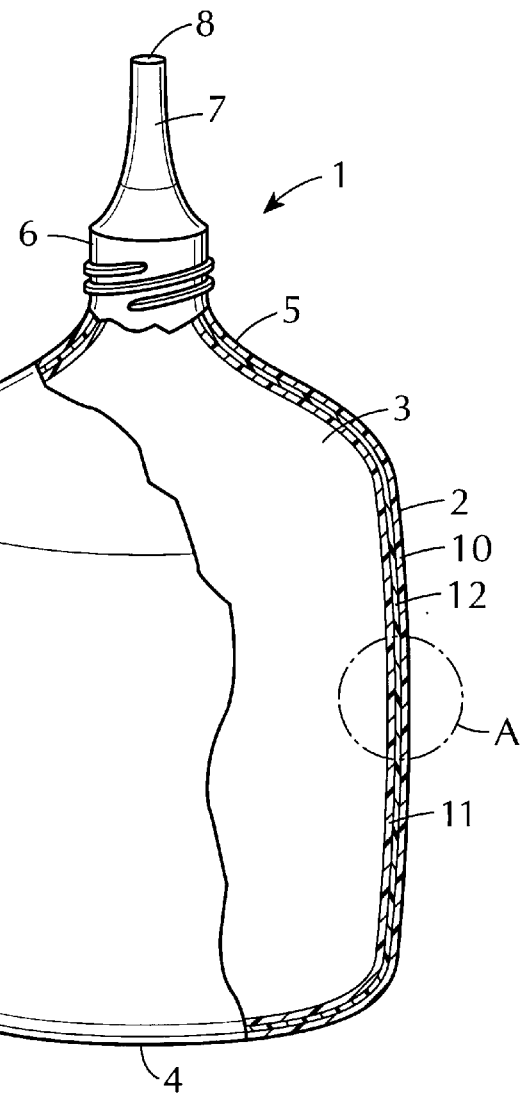
FIG. 1 is a partial cross-sectional view of a container in accordance with the present invention.

Referring now to the drawings, FIG. 1 shows the container, generally referred to as 1, of the present invention. The container 1 comprises a container wall 2 defining a product compartment 3 capable of holding a product therein. The container wall 2 has a closed end 4 and an open end 5. The open end 5 is bounded by an annular neck 6. The neck 6, in turn, is typically provided with a restrictor 7 which defines a dispensing passageway 8. The dispensing passageway 8 enables the product to be dispensed from the container. FIG. 1. shows the restrictor 7 formed in the shape of a nozzle. The restrictor, however, can also be a simple orifice reducer which is placed within the neck of the container in order to provide a smaller orifice through which to dispense the product.

Typically, and not shown in FIG. 1, a closure is provided to seal the product within the container, thereby decreasing exposure of the product to the external atmosphere, and increasing the useful life of the product.

Figure 2:
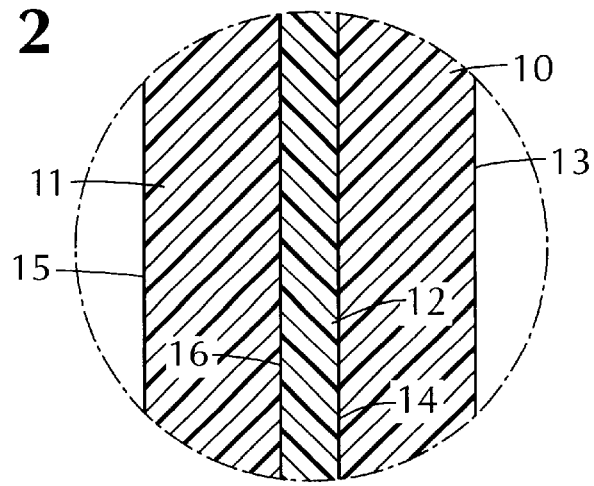
FIG. 2 is an exploded view of section A of FIG. 1.

The wall 2 of the container 1 is a multilayered structure. As seen in greater detail in FIG. 2, the multi-layer structure comprises an external layer 10, an internal layer 11, and an intermediate layer 12 positioned between the external layer 10 and the internal layer 11. The external layer 10 contacts the external atmosphere along its outer surface 13 and the intermediate layer 12 along its inner surface 14. The internal layer 11 contacts the product along its outside surface 15 and the intermediate layer 12 along its inside surface 16.

The External Layer and the Internal Layer

The external layer 10 and the internal layer 11 are formed from a polyolefin material. Preferably, the polyolefin material is selected from the group consisting of polyethylene, polypropylene, and blends of polyethylene and polypropylene. Most preferably, the polyolefin material is low-density polyethylene. Other materials can also be effectively used for the external and internal layers, provided, however, that the material used is capable of being adhesively bonded to the intermediate layer, and does not decrease the squeezability of the container.

The external layer 10 and the internal layer 11 are relatively thin layers, as compared to the thickness of the traditional layers associated with cyanoacrylate containers. The thin layers of the present invention are less than about 0.020 inches thick, whereas the traditional layers are greater than 0.040 inches thick. These thin layers allow the container to be readily deformable when pressure is exerted upon them by the human hand.

Preferably, the material comprising the external and internal layers has a density from about 0.89 to 0.97 g/cm$^3$, most preferably from about 0.91 to 0.94 g/cm$^3$; and has a WVTR of from about 0.3 to about 1.3 g/24 hrs-100 in$^2$-mil at 95° F., 90% relative humidity.

The Intermediate Layer

The intermediate layer 12 comprises a barrier material mixed with an adhesive resin. The intermediate layer 12 is coextruded between the external layer and the internal layer, thus making the intermediate layer shielded from contact with both the product and the external atmosphere of the container by the internal layer and the external layer, respectively.

The Barrier Material

The barrier material used will depend upon the product stored within the container. For example, if the product stored within the container requires an oxygen barrier, then the material of choice would be one which could provide such a barrier. Preferably, the barrier material is a copolymer of ethylene and vinyl, such as, for example, ethylene vinyl alcohol (EVOH). Other materials, such as, for example, nylon can also be used.

The material chosen for the barrier will depend upon the barrier properties required for the container. For example, if the container was required to exhibit excellent vapor (solvent) barrier characteristics and good gas barrier ($O_2$ and $CO_2$) characteristics, while not requiring significant water vapor barrier characteristics, then EVOH would be a suitable material of choice for the barrier material of the intermediate layer.

The Adhesive Resin

The adhesive resin enables the barrier material to adhere to the external layer and the internal layer without delaminating. The adhesive resin used will depend upon the barrier material chosen. For example, if the barrier material is EVOH, then an appropriate choice of adhesive resin would be an anhydride-modified polyolefin.

Preferably, the adhesive resin is selected from the group consisting of anhydride-modified polyethylene, anhydride-modified high-density polyethylene, anhydride-modified linear low-density polyethylene, anhydride-modified low-density polyethylene, and anhydride-modified polypropylene. Most preferably, the adhesive resin is an anhydride-modified linear low-density polyethylene, such as Bynel® 4164, 4107, 4109, 41E532, 41E557, and 41E558, all available from E.I. du Pont de Nemours and Company.

Mixing the Barrier Material and the Adhesive Resin

To form the intermediate layer, the barrier material, the adhesive resin, and a carrier are, in a dry state, weighed in the proper percentages and blended together to form a single mixture. Next, the mixture of the barrier material, the adhesive resin, and the carrier are added to a hopper and melted. The carrier material is preferably a polyolefin, such as those stated above; most preferably LDPE.

Preferably, the intermediate layer comprises from about 10% to about 30% by weight barrier material, from about 5% to about 10% by weight adhesive, and from about 60% to about 85% by weight carrier. In a most preferred embodiment, the intermediate layer comprises approximately 30% by weight barrier material, 10% by weight adhesive, and 60% by weight carrier.

The advantages to this novel blended material, among other things, is that it allows for less layers in the container structure, enables the production of lighter weight containers, and requires less manufacturing steps during production, which all lead to the increased economical production of such containers.

Coextruding the External Layer, the Internal Layer, and the Intermediate Layer

To form the container of the present invention, the external layer, the internal layer, and the intermediate layer are first coextruded together to form a multi-layer material. To form the multi-layer material, each of the materials which are to comprise the internal layer, the external layer, and the intermediate layer are all placed in separate extruders. Each of these materials are then heated until flowable. Then, the flowable materials are either extruded or injected together to form a parison, which is then blow-molded into the desired container shape. The process for extrusion and injection blow-molding of a container is well known in the art, and need not be described in detail herein.

The benefit associated with the multi-layer material of the present invention is that fewer steps are required during production. The traditional multi-layer material used for cyanoacrylate adhesive containers is a five layer structure comprising a layer of low-density polyethylene, a tie layer of an adhesive, a layer of EVOH, a tie layer of an adhesive, and a final layer of low-density polyethylene. The traditional structure requires five separate extruders in order to form the coextruded multi-layer material for the container. The present invention requires only three extruders due to the novel approach of forming a separate intermediate layer by mixing an adhesive resin with a barrier material before coextrusion into a final multi-layer material.

Properties of the Container After Molding

The final molded container is designed as a self-supporting structure. In other words, the container will not deform under its own weight, or under the weight of the product alone. In addition, and as opposed to the traditional structures used, the container of the present invention is readily deformable by the human hand. The deformable nature of the container allows the user to more accurately control the amount of product being dispensed.

In order to compare the container of the present invention to an existing container, several samples were manufactured with the following construction:

Sample 401: an HDPE/EVOH (30%)/PP+EPDM Copolymer container manufactured according with intermediate layer according to the present invention;

Sample 501: an HDPE/EVOH (10%)/LDPE container manufactured with an intermediate layer according to the present invention;

Sample 601: an HDPE/EVOH (30%)/LDPE container manufactured with an intermediate layer according to the present invention; and Control: monolayer HDPE container.

When the squeeze forces of the above containers were measured, it was unexpectedly discovered that the force required to depress the center of a panel of a container manufactured according to the present invention was dramatically less than that of the typical monolayer HDPE container. The results of the test are shown in Table 1 below.

To test the squeeze force of the containers, each container was first secured to an Instron Testing Machine such that the panel to be measured was centered within the machine. Next, the crosshead was set to a speed of 12 in/minute with a maximum travel distance of ¼ inch. Then, a standard compression test was run on each of the samples described above. The results were as follows:

TABLE 1

| Sample | Average Force to Squeeze (lbs.) |
| --- | --- |
| 401 | 5.1 |
| 501 | 3.6 |
| 601 | 3.6 |
| Control | 8.8 |

The container of the present invention also has the advantage of providing barrier characteristics which are suitable for the product within the container (i.e., cyanoacrylate adhesives). The thin internal and external layers of the present container provide a sufficient moisture barrier, and the intermediate layer provides a sufficient solvent barrier. The combination of these materials helps ensure an acceptable shelf-life by limiting the exposure of the product to moisture, which may have an adverse affect on the product. In addition, the barrier materials also serve to limit the egress of vapor from the product through the container, thus reducing the appearance of unsightly deposits on the outside of the container.

Thus, while the foregoing detailed description has disclosed what is presently believed to be the preferred embodiments of the invention, those skilled in the art will appreciate that other and further changes and modifications can be made without departing from the scope or spirit of the invention, and it is intended that all such other changes and modifications are included in and are within the scope of the invention as described in the appended claims.

What is claimed is:

1. A squeezable, multi-layer, structurally self-supporting container capable of dispensing a controlled amount of a liquid product, said container comprising:
    an external layer, said external layer formed from a polyolefin material;
    an internal layer, said internal layer formed from a polyolefin material; and
    an intermediate layer positioned between, and in contiguous contact with, the external layer and the internal layer, said intermediate layer formed of a barrier material blended with an adhesive resin and a carrier.

2. The container of claim 1 wherein the external layer is selected from the group consisting of polyethylene, polypropylene, and blends thereof.

3. The container of claim 2 wherein the external layer is low-density polyethylene.

4. The container of claim 1 wherein the internal layer is selected from the group consisting of polyethylene, polypropylene, and blends thereof.

5. The container of claim 4 wherein the internal layer is High-density polyethylene.

6. The container of claim 1 wherein the intermediate layer comprises from about 10% to about 30% by weight barrier material, from about 5% to about 10% by weight adhesive, and from about 60% to about 85% by weight carrier.

7. The container of claim 6 wherein the intermediate layer comprises approximately 30% by weight barrier material, 10% by weight adhesive, and 60% by weight carrier.

8. The container of claim 1 wherein the barrier material is ethylene vinyl alcohol.

9. The container of claim 1 wherein the adhesive resin is an anhydride-modified polyolefin.

10. The container of claim 9 wherein the adhesive resin is selected from the group consisting of anhydride-modified polyethylene, anhydride-modified high-density polyethylene, anhydride-modified linear low-density polyethylene, anhydride-modified low-density polyethylene, and anhydride-modified polypropylene.

11. The container of claim 1 wherein the carrier is low-density polyethylene.

12. The container of claim 1 wherein said liquid product is an adhesive.

13. The container of claim 1 wherein said liquid product is a cyanoacrylate adhesive.

14. A method of forming a squeezable, multi-layer, structurally self-supporting container capable of dispensing a controlled amount of a liquid product, comprising:
    a) forming a parison including;
        an external polyolefin layer;
        an internal polyolefin layer; and
        an intermediate layer positioned between, and in contiguous contact with, the external layer and the internal layer, said intermediate layer formed of a barrier material blended with an adhesive resin and a carrier; and
    b) blow-molding the parison into the desired container shape.

15. The method of claim 14 wherein the barrier material, the adhesive resin, and the carrier are blended together in a dry state to form a single mixture.

16. The method of claim 14 wherein the intermediate layer comprises from about 10% to about 30% by weight barrier material, from about 5% to about 10% by weight adhesive, and from about 60% to about 85% by weight carrier.

17. The method of claim 16 wherein the intermediate layer comprises approximately 30% by weight barrier material, 10% by weight adhesive, and 60% by weight carrier.

18. The method of claim 14 wherein said liquid product is an adhesive.

19. The method of claim 14 wherein said liquid product is a cyanoacrylate adhesive.

* * * * *